United States Patent
Nakagawa

(10) Patent No.: US 9,740,394 B2
(45) Date of Patent: Aug. 22, 2017

(54) DISPLAY/INPUT DEVICE WITH SWIPE FUNCTIONALITY, IMAGE FORMING APPARATUS THEREWITH, AND METHOD OF CONTROLLING A DISPLAY/INPUT DEVICE WITH SWIPE FUNCTIONALITY

(71) Applicant: KYOCERA Document Solutions Inc., Osaka-shi, Osaka (JP)

(72) Inventor: Hiroshi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 233 days.

(21) Appl. No.: 14/037,083

(22) Filed: Sep. 25, 2013

(65) Prior Publication Data
US 2014/0089840 A1 Mar. 27, 2014

(30) Foreign Application Priority Data

Sep. 26, 2012 (JP) ................................. 2012-212832
Jul. 26, 2013 (JP) ................................. 2013-155847

(51) Int. Cl.
*G06F 3/048* (2013.01)
*G06F 3/0488* (2013.01)
(Continued)

(52) U.S. Cl.
CPC ........ *G06F 3/0488* (2013.01); *G06F 3/04847* (2013.01); *G06F 3/04883* (2013.01);
(Continued)

(58) Field of Classification Search
CPC ........ G06F 9/4446; G06F 8/73; G06F 3/4488; G06F 3/04847; G06F 3/1201; H04N 1/46
(Continued)

(56) References Cited

U.S. PATENT DOCUMENTS 5,546,521 A * 8/1996 Martinez ............... G06F 9/4446
715/708
2001/0026290 A1* 10/2001 Machida ............ H04N 1/00411
715/810
(Continued)

FOREIGN PATENT DOCUMENTS

CN 1977234 A 6/2007
CN 101639758 A 2/2010
(Continued)

OTHER PUBLICATIONS

English Abstract and Machine Translation for JP 2007-213615, published Aug. 23, 2007.
(Continued)

*Primary Examiner* — Patrick Riegler
*Assistant Examiner* — Alex Olshannikov
(74) *Attorney, Agent, or Firm* — Polsinelli PC

(57) ABSTRACT

A display/input device has a display portion and a touch panel portion. The display portion displays selection keys and displays a setting screen of a selected setting item. The touch panel portion is provided for the display portion to detect a touch position of user input and a tap-and-drag operation in which while a touch is maintained the touched position is moved. When a tap-and-drag operation is detected within the display position of a selection key, the display portion displays a setting item explanation screen that explains the setting item corresponding to the selection key at the position where the tap-and-drag operation has been made.

11 Claims, 10 Drawing Sheets

(51) Int. Cl.
  *G06F 3/0484* (2013.01)
  *G06F 3/12* (2006.01)
  *H04N 1/46* (2006.01)
  *G06F 9/44* (2006.01)

(52) U.S. Cl.
  CPC ........ *G06F 3/04886* (2013.01); *G06F 3/1201* (2013.01); *G06F 9/4446* (2013.01); *H04N 1/46* (2013.01)

(58) Field of Classification Search
  USPC .................. 715/705, 708, 711, 715, 717
  See application file for complete search history.

(56) References Cited

U.S. PATENT DOCUMENTS

| | | | |
|---|---|---|---|
| 2003/0210282 A1* | 11/2003 | Bosma | G06F 3/0486 715/845 |
| 2005/0071761 A1 | 3/2005 | Kontio | |
| 2006/0123341 A1* | 6/2006 | Smirnov | G06F 3/0481 715/708 |
| 2006/0136833 A1 | 6/2006 | Dettinger et al. | |
| 2008/0059961 A1* | 3/2008 | Miranda-Steiner | G06F 9/4446 717/171 |
| 2009/0296131 A1* | 12/2009 | Yoshida | H04N 1/0035 358/1.15 |
| 2010/0026643 A1 | 2/2010 | Ozawa et al. | |
| 2010/0107076 A1* | 4/2010 | Grohman | F24F 11/006 715/709 |
| 2011/0199639 A1* | 8/2011 | Tani | G06F 3/04886 358/1.15 |
| 2011/0271222 A1* | 11/2011 | Cho | G06F 3/0481 715/773 |
| 2012/0019863 A1* | 1/2012 | Sensu | H04N 1/0044 358/1.15 |
| 2012/0176398 A1 | 7/2012 | Takaoka et al. | |
| 2013/0033525 A1* | 2/2013 | Markiewicz | G06F 3/0485 345/684 |

FOREIGN PATENT DOCUMENTS

| | | |
|---|---|---|
| CN | 102439569 A | 5/2012 |
| JP | 2006133892 A | 5/2006 |
| JP | 2007-213615 A | 8/2007 |
| JP | 2011170574 | 9/2011 |
| JP | 2012133523 | 7/2012 |
| WO | 2012149808 A1 | 10/2011 |

OTHER PUBLICATIONS

English language abstract of CN1977234A, published Jun. 6, 2007.
English language abstract of CN101639758A, published Feb. 3, 2010.
Japanese Office Action; Application No. 2013-155847; Received Jun. 7, 2016.
English machine translation of JP2006-133892.
English Abstract of JP2011170574; Retrieved on Jun. 10, 2016 from www.espacenet.com.
English Abstract of JP2012133523; Retrieved on Jun. 10, 2016 from www.espacenet.com.
Extended European Search Report for EP Application No. 13185778.1, mailed Jan. 19, 2017, 10 pages.

* cited by examiner

FIG.12

DISPLAY/INPUT DEVICE WITH SWIPE FUNCTIONALITY, IMAGE FORMING APPARATUS THEREWITH, AND METHOD OF CONTROLLING A DISPLAY/INPUT DEVICE WITH SWIPE FUNCTIONALITY

INCORPORATION BY REFERENCE

This application is based upon and claims the benefit of priority from the corresponding Japanese Patent Applications Nos. 2012-212832 and 2013-155847 filed on Sep. 26, 2012 and Jul. 26, 2013 respectively, the entire contents of which are incorporated herein by reference.

BACKGROUND

The present disclosure relates to a display/input device having a display portion for displaying an image of keys for setting and the like and a touch panel portion. The present disclosure also relates to an image forming apparatus provided with a display/input device.

An input device is known that has a display portion for displaying keys for operation and setting, images, and information, and a touch panel or the like for accepting input for operation and setting. For example, image forming apparatuses (such as multifunction peripherals, copiers, printers, and FAX (facsimile) machines) are provided with an input device including a display portion and a touch panel for the purpose of setting a function to be used and setting items related to the function.

Conventionally, various improvements have been made in input devices to allow easy input and to enhance the ease of input (ease of use). For example, in a known input device, a plurality of character keys respectively having a plurality of kinds of characters indicated thereon are provided; a point initially touched within the region of the character keys is detected as start point A; a point where a bar-touch operation, that is, movement across a predetermined length from start point A with the touch maintained, is canceled is detected as end point B; a linear distance d and a direction θ are acquired based on the starting and end points; the acquired direction is determined; whether or not the acquired linear distance is within a predetermined range of values is determined; when the linear distance is determined to be within the predetermined range of values, the character set according to the direction determined by a direction discriminator with respect to the center position of the character key which includes the start point is selected and output; and when the linear distance is determined to be outside the predetermined range of values, a function for assisting key input according to the direction is operated.

In using the various functions of an image forming apparatus, a large number of selectable, settable setting items are available (for example, several tens to several hundred). For example, a copying function has setting items related to print quality such as density settings of printing results, setting items related to page layout such as two-side printing and consolidated printing, etc. Moreover, some image forming apparatuses provide a plurality of functions (copying, printing, scanning, image data transmission, etc.), and these multifunction peripherals have an even larger number of setting items.

To obtain desired job results, a user selects setting items to be used and sets set values for setting items by use of an input device such as an operation panel with respect to an image forming apparatus. However, when there are a large number of setting items available, setting methods tend to be complicated. Moreover, it takes time to get used to setting on the operation panel. Moreover, setting a certain set value for a certain setting item may automatically inhibit the setting of a certain set value for another setting item (incompatibility). For example, in color setting, there is incompatibility such that selecting black and white inhibits color-related settings. However, some users may wonder why they are inhibited from setting those settings.

As discussed above, when a large number of setting items are available, some of them may well be obscure in terms of their setting methods and the results they will produce. Also, the user may feel at a loss what setting items to select and what set values to set to obtain desired job results.

Thus, the operation panel is often made capable of displaying, on its display portion, various help screens. By referring to the help screens displayed, the user at a loss how to operate can grasp the content and setting methods of setting items and set values. In other words, help screens guide the user and aid his understanding.

Here, help screens are generally called up with a press on a help key (pressing a help key causes a help screen to be displayed on the display portion). The help key is often displayed as a software key on the display portion (it may also be provided as a hardware key).

However, the help key may be located away from keys for selecting setting items, or may be displayed at varying positions from one screen to another for convenient layout of keys and images displayed. Thus, the help key often falls out of attention. Moreover, to call up a help screen, the user needs to find the help key and then touch the display position of the help key. In some cases, after touching the display position of the help key, the user may be required to make a further operation, for example, to select a desired help screen. For these reasons, calling up help screens poses a problem of poor operability. Poor operability makes the user feel it troublesome to call up help screens.

Incidentally, the well-known technology mentioned above is directed to simplification of input by the user but does not display help screens. Thus, the well-known technology mentioned above does not help overcome the problem of poor operability in calling up help screens.

SUMMARY

To overcome the above-mentioned problem, a display/input device has a display portion and a touch panel portion. The display portion displays selection keys for selection among a plurality of setting items included in a function, and displays a setting screen of a selected setting item. The touch panel portion is provided with respect to the display portion to accept input by the user by detecting a touch position and a tap-and-drag operation in which while a touch is maintained the touched position is moved. When a tap-and-drag operation is detected within the display position of a selection key, the display portion displays a setting item explanation screen that explains the setting item corresponding to the selection key at the position where the tap-and-drag operation has been made.

Further features and advantages of the present disclosure will become apparent from the description of embodiments given below.

BRIEF DESCRIPTION OF THE DRAWINGS

FIG. 12 is a diagram showing a shift to a status screen according to one embodiment of the present disclosure.

DETAILED DESCRIPTION

Hereinafter, with reference to FIGS. 1 to 12, embodiments of the present disclosure will be described. The following description takes, as an example, a multifunction peripheral 100 (corresponding to an image forming apparatus) that includes an operation panel 1 (corresponding to a display/input device). It should however be understood that any specific features in terms of structure, arrangement, etc. mentioned in connection with the embodiments are simply illustrative and are not meant to limit the scope of the disclosure in any way.

(Outline of an Image Forming Apparatus)

Figure 1:
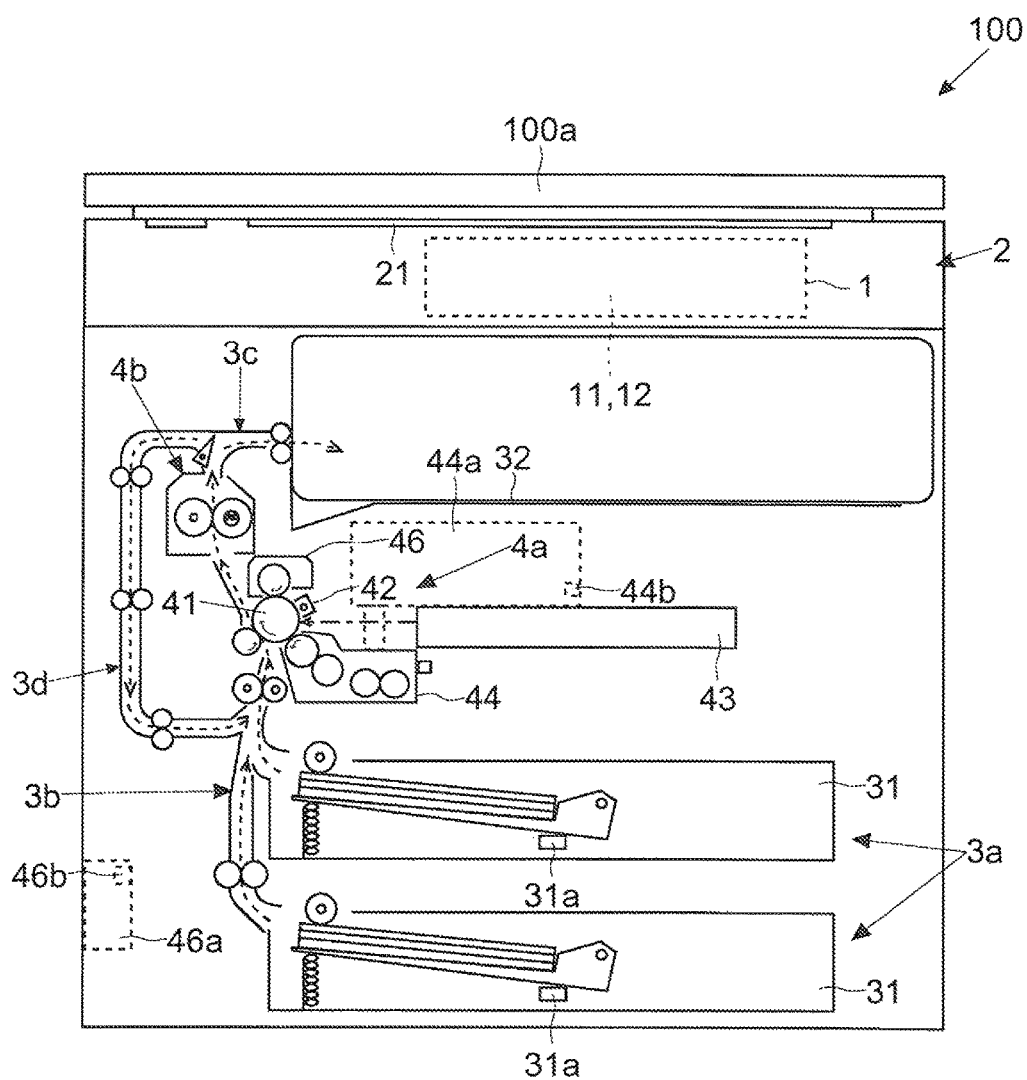
FIG. 1 is a diagram showing a multifunction peripheral according to one embodiment of the present disclosure.

First, with reference to FIG. 1, an outline of a multifunction peripheral 100 according to an embodiment will be described. FIG. 1 is a diagram showing the multifunction peripheral 100.

As shown in FIG. 1, in an upper front part of the multifunction peripheral 100, an operation panel 1 (described in detail later) for making various settings with respect to the multifunction peripheral 100 is provided. Moreover, as shown in FIG. 1, in a top part of the multifunction peripheral 100 according to the embodiment, an image reading section 2 including a document cover 100a is arranged. Moreover, inside the main body of the multifunction peripheral 100, there are provided a sheet feed section 3a, a transport section 3b, an image formation section 4a, a fusing section 4b, a discharge transport section 3c, a two-side transport section 3d. etc.

The image reading section 2 reads a document and generates image data.

With respect to printing, the sheet feed section 3a feeds sheets of a printing medium, one sheet after another, into the transport section 3b. The transport section 3b transports the sheet to a sheet discharge tray 32. The image formation section 4a forms a toner image based on the image data, and transfers the toner image to the sheet being transported. The fusing section 4b fuses the toner image transferred to the sheet. After the fusion of the toner, the sheet (printed sheet) is discharged onto the sheet discharge tray 32. The discharge transport section 3c transports the sheet, when discharging the printed sheet, toward the sheet discharge tray 32 and, when performing two-side printing, toward the two-side transport section 3d. In this way, when a copier or printer function is used, image formation (printing) is performed.

(Operation Panel 1)

Figure 2:
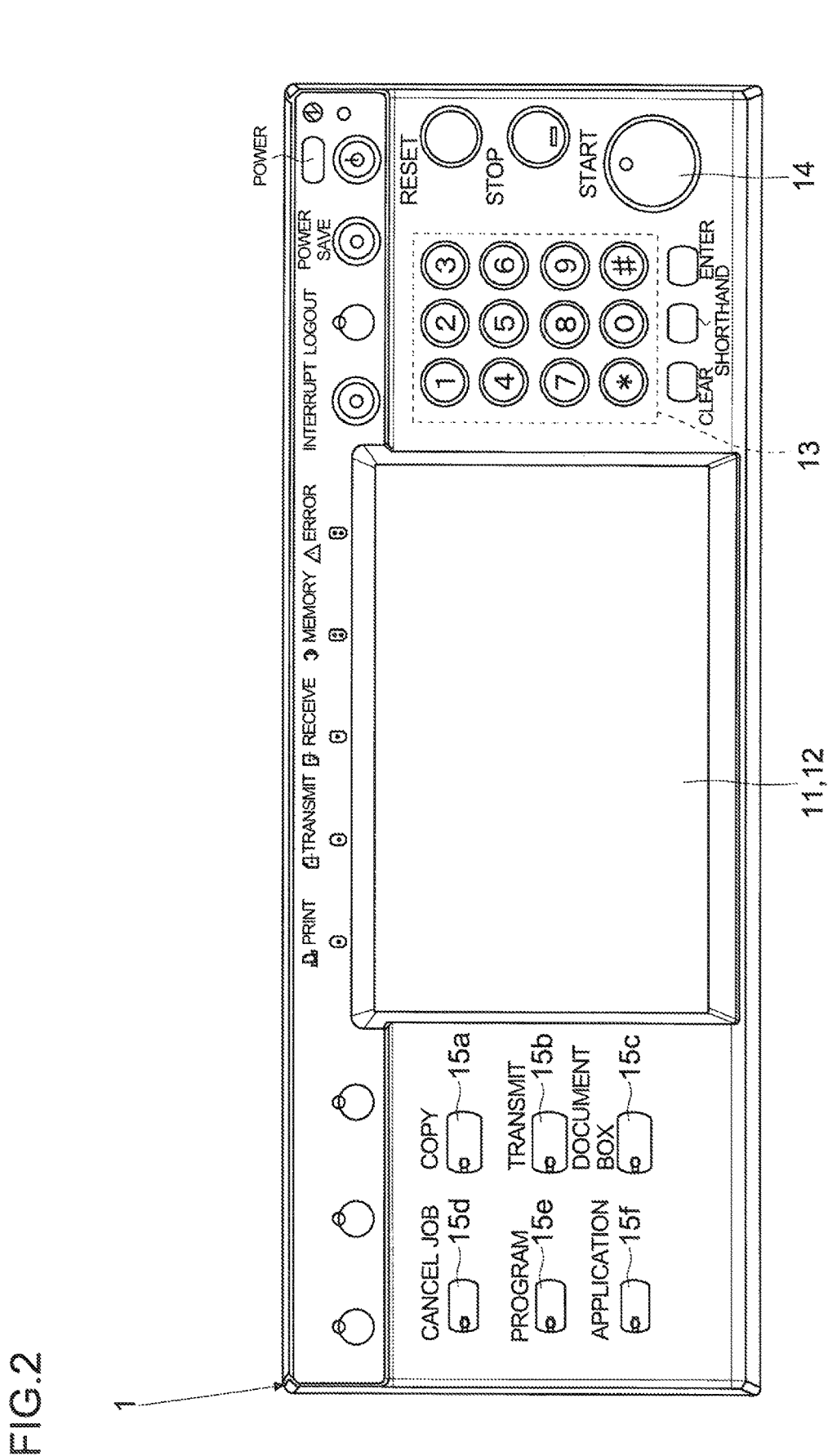
FIG. 2 is a diagram showing an operation panel according to one embodiment of the present disclosure.

Next, with reference to FIG. 2, the operation panel 1 according to the embodiment will be described. FIG. 2 is a plan view showing the operation panel 1.

As shown in FIG. 1, the operation panel 1 is provided in a top front part of the multifunction peripheral 100. The operation panel 1 includes a display portion 11, a touch panel portion 12, hardware keys (a numerical keypad portion 13 for entry of numerical figures, a START key 14 for requesting the start of a process such as copying, etc.), function selection keys, etc.

The display portion 11 is a liquid crystal display panel. The display portion 11 may instead be any other type of display panel, such as an organic EL panel. The display portion 11 displays menus and keys for making settings on the multifunction peripheral 100. Specifically, the display portion 11 displays selection keys for selection among a plurality of setting items included in a function, and displays a setting screen of a selected setting item. In a setting screen of a setting item, the display portion 11 displays, within the setting screen, setting keys for setting a set value of the setting item.

By operating the keys displayed on the display portion 11, the user can enter various settings for the multifunction peripheral 100. Moreover, the display portion 11 displays various images and screens, such as messages indicating the status of the multifunction peripheral 100.

On the top face of the display portion 11, the touch panel portion 12 is provided. The touch panel portion 12 detects the position (coordinates) touched by the user; by comparing the display positions of keys with the touched position, it identifies the key selected/specified by the user and accepts input by the user. So that the touch panel portion 12 can recognize a plurality of positions touched simultaneously, it is implemented with a projective capacitive touch panel 12b. The touch panel portion 12 is not limited to a projective capacitive type.

On the left side of the display portion 11, a plurality of function selection keys for selecting which to use among different functions of the multifunction peripheral 100 are provided. The function selection keys includes a COPY key 15a, a TRANSMIT key 15b, a BOX key 15c, a CANCEL JOB key 15d, a PROGRAM key 15e, an APPLICATION key 15f, etc. The COPY key 15a is pressed when a copying function is used. The TRANSMIT key 15b is pressed when a transmission function is used. The BOX key 15c is pressed when a box function is used. The CANCEL JOB key 15d is pressed when a job is canceled. The PROGRAM key 15e is pressed when a program function is used. The APPLICATION key 15f is pressed when an application function is used. When any of the function selection keys is pressed, the display portion displays, with respect to the selected function, a screen for selection among setting items and for setting of set values. The functions will be described in detail later.

In the multifunction peripheral 100 according to the embodiment, the function selection keys are implemented as hardware keys. Instead, the display portion 11 may display software keys for selection among different functions so that a function to be used is selected with a touch on the touch panel portion 12. In other words, the function selection keys may be software keys.

(Hardware Configuration of the Multifunction Peripheral 100 Etc.)

Figure 3:
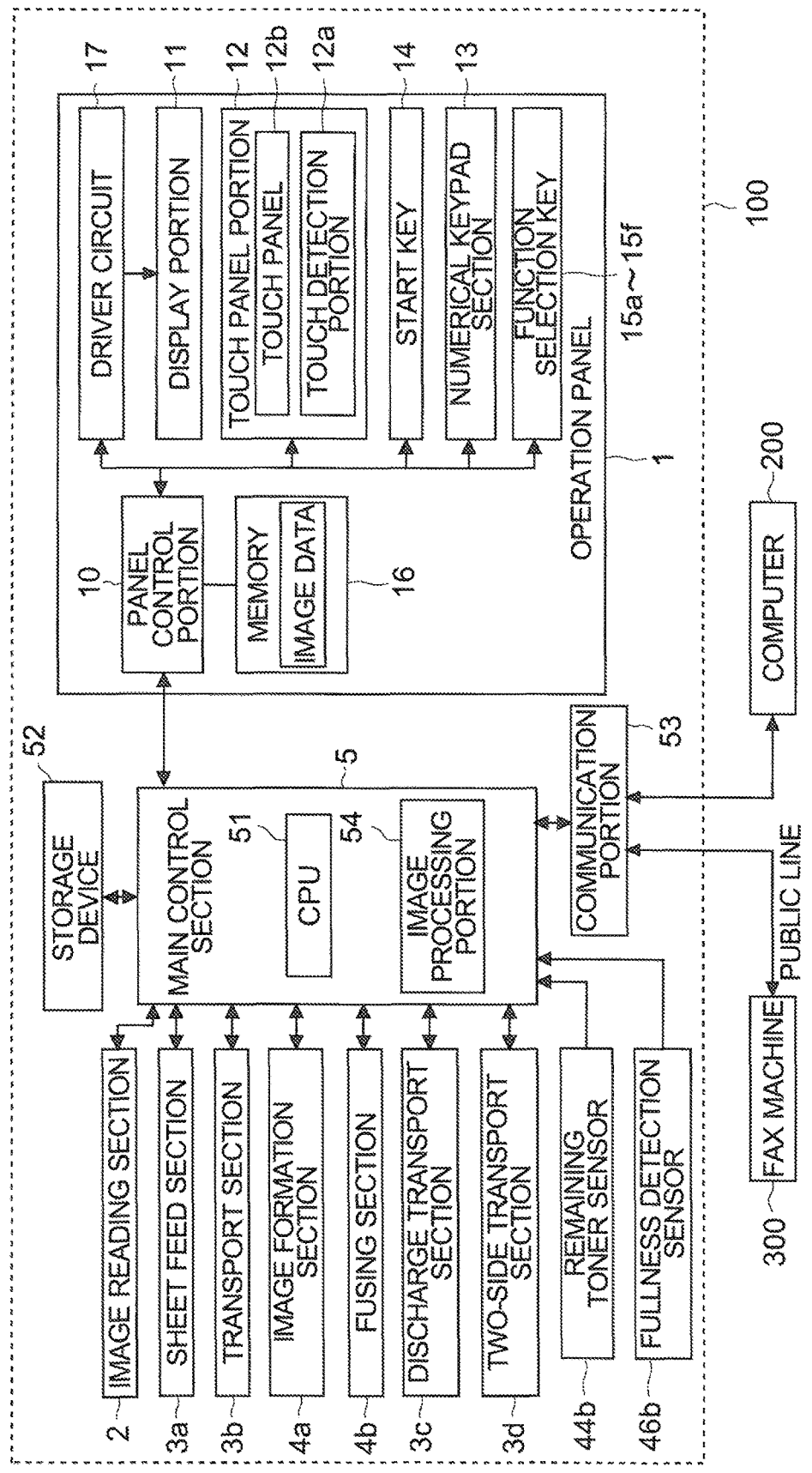
FIG. 3 is a diagram showing the hardware configuration of a multifunction peripheral and an operation panel according to one embodiment of the present disclosure.

Next, with reference to FIG. 3, the hardware configuration of the multifunction peripheral 100 and the operation panel 1 according to the embodiment will be described. FIG. 3 is a block diagram showing the hardware configuration of the multifunction peripheral 100 and the operation panel 1.

Inside the main body of the multifunction peripheral 100, a main control section 5 is provided. The main control section 5 is connected to, and controls, the operation panel 1, the image reading section 2, the sheet feed section 3a, the transport section 3b, the image formation section 4a, the fusing section 4b, the discharge transport section 3c, the two-side transport section 3d, etc.

The main control section 5 includes circuits and devices for controlling a CPU 51 etc. The CPU 51 performs calculations and the like based on control programs stored and mapped in a storage device 52, and controls different parts of the multifunction peripheral 100. The storage device 52 is a combination of nonvolatile and volatile memories, such as a ROM, a RAM, and a HDD. The storage device 52 stores control programs for the multifunction peripheral 100 and different kinds of data such as control data, setting data, and image data. In the main control section 5, an image processing portion 54 for performing image processing on image data is provided. The image data processed by the main control section 5 is transmitted to an exposing device 43 so as to be used for the scanning/exposure of a photosensitive drum 41 and to be stored in the storage device 52.

The main control section 5 is connected to a communication portion 53. The communication portion 53 is connected across a network or a public line to a computer 200 or a FAX (facsimile) machine 300 (for simplicity's sake, only one of each is shown in FIG. 3).

The main control section 5 also recognizes input made on the operation panel 1, and controls the multifunction peripheral 100 to perform jobs such as copying and scanning according to the settings of the user. In the embodiment, the operation panel 1 includes a panel control portion 10, a display portion 11, a touch panel portion 12, hardware keys (such as a numerical keypad section 13, a START key 14, and selection keys for different functions), a memory 16 (corresponding to a storage portion), and a driver circuit 17. The panel control portion 10 includes a CPU, an IC, etc. The panel control portion 10 controls the display on the display portion 11. The panel control portion 10 is also fed with the output of the touch panel portion 12 and recognizes the touched position (coordinates).

The memory 16 includes a ROM and a RAM. The panel control portion 10 compares the touched position with the image data of the screen displayed on the display portion 11 at the time of the touch, and recognizes the key displayed at the touched position. This permits the panel control portion 10 to recognize keys specified by the user.

The touch panel portion 12 is provided with respect to the display portion 11 to accept input by the user, to detect the touched position, and also to detect a tap-and-drag operation (in which while a touch is maintained the touched position is moved). Specifically, the touch panel portion 12 includes a touch panel 12b and a touch detection portion 12a. The touch detection portion 12a is an IC. Based on the output of the touch panel 12b, the touch detection portion 12a detects the touched position (coordinates), and also detects a tap-and-drag operation in which while a touch is maintained the touched position is moved across a previously determined distance or more. Based on the output voltage of the touch panel 12b, the touch detection portion 12a periodically detects the touched position. Then, after the touch on the touch panel 12b is detected until the touch is released, the touch detection portion 12a calculates the distance between the currently touched position and the position touched at the time point of the previous detection, and periodically accumulates the distance. When the distance exceeds the previously determined distance, the touch detection portion 12a detects (recognizes) a tap-and-drag operation.

Based on the output of the touch panel portion 12 (the data received from the touch detection portion 12a), the panel control portion 10 recognizes the touched position and a tap-and-drag operation. The touch detection portion 12a may be omitted, in which case the panel control portion 10 may be fed with the output of the touch panel 12b of the touch panel portion 12 so that panel control portion 10 directly detects the touched position and a tap-and-drag operation.

The image data of the screens and images displayed on the display portion 11 is stored, for example, in the memory 16 within the operation panel 1 (may instead be stored in the storage device 52). According to the key displayed at the touched position (the key of which the selection/setting has been accepted), the panel control portion 10 reads out from the memory 16 the image data of the screen or image to be displayed next, and makes the display portion 11 switch the display of the screen/image on it.

(Functions of the Image Forming Apparatus)

Next, with reference to FIGS. 2 and 3, the functions of the multifunction peripheral 100 (the functions that can be used on the multifunction peripheral 100) will be described.

On the multifunction peripheral 100 according to the embodiment, as described above, the function selection keys allow selection of which to use among different functions, namely a copying function, a transmission function, a box function, a job cancel function, a program function, and an application function. The multifunction peripheral 100 also has a printer function which allows printing based on image data and setting data transmitted from the computer 200.

The copying function is a function whereby a document is read and based on the image data obtained through the reading, printing is performed to duplicate the document. With respect to the copying function, a plurality of setting items are available (which will be described in detail later). When the COPY key 15a is pressed, the display portion 11 displays a selection screen for selection among setting items related to the copying function. After a setting item is selected and a set value is set, when the START key 14 is pressed, based on the settings made on the operation panel 1 with respect to copying, the main control section 5 makes the image reading section 2 read the document to print a duplicate of the document.

The transmission function is a function whereby a document is read, the image data obtained through the reading is processed, and the image data is transmitted to a computer 200 or a FAX machine 300. When the TRANSMIT key 15b is pressed, the display portion 11 displays a selection screen for selection among setting items related to the transmission function. Various setting items are available such as the resolution and format of image data and image density. The user makes input on the operation panel 1 to select a desired setting item with respect to the transmission function, and sets a set value on the setting screen of the selected setting item.

When the transmission function is selected by the function selection keys and the START key 14 is pressed, based on the settings on the operation panel 1 with respect to transmission, the main control section 5 makes the image reading section 2 read the document and operates the image processing portion 54, the communication portion 53, etc. to make them transmit image data based on the document.

The box function is a function whereby a document is read, the image data obtained through the reading is stored (accumulated) in the storage device 52, and the accumulated image data is later reused (for copying, transmission, etc.). When the BOX key 15c is pressed, the display portion 11 displays a selection screen for selection among setting items related to the box function. Various setting items are available such as the location of storage in the storage device 52 where the read document is stored, the resolution and format of the image data stored, image density, the manner of use of the image data stored in the storage device 52, and deletion of the image data stored. The user makes input on the operation panel 1, selects a desired setting item with respect to the box function, and sets a set value on the setting screen of the selected setting item.

When the box function is selected by the function selection keys and the START key 14 is pressed, based on the settings made on the operation panel 1 with respect to the box function, the main control section 5 makes the relevant parts operate.

The job cancel function is a function whereby a job currently being executed, or a job currently waiting for its execution, is canceled (called off). When the CANCEL JOB key 15d is pressed, the display portion 11 displays a screen with respect to job cancellation; for example, it displays the job currently being executed or a job waiting for its execution. The user makes input on the operation panel 1 to select the job to be canceled. The main control section 5 does not execute the job of which the cancellation is requested on the operation panel 1.

The program function is a function whereby a program is registered in the memory 16 or the storage device 52, and a registered program is called or deleted. In the embodiment, a program denotes an entity that, when called, sets the set values of setting items to those set by the program. When a program is called, the operation panel 1 goes into a state set according to the content of the program. For example, the user defines and registers a program for a plurality of setting items of a function that the user often uses. This saves the user from setting the plurality of setting items one by one each time he uses the function.

When the PROGRAM key 15e is pressed, the display portion 11 displays a selection screen for selection among setting items related to the program function. For example, as the setting items, various setting items are available such as those related to registration of programs, those related to use of registered programs, and those related to the displaying order of programs. The user makes input on the operation panel 1 to select a desired setting item with respect to the program function and sets a set value on the selection screen of the selected setting item.

When the program function is selected by the function selection keys and a request to call a program is made as by pressing the START key 14, the main control section 5 brings the operation panel 1 into a state where the set values of the setting items are set as determined by the program.

The application function is a function whereby an application (extension program) prepared for more convenient and comfortable use of the multifunction peripheral 100 is installed in the storage device 52, and is started up and run. For example, various applications developed for different purposes are available. For example, an application is available that allows image data obtained through document reading to be classified into a database for given purposes.

When the APPLICATION key 15f is pressed, the display portion 11 displays a selection screen for selection among setting items related to the application function. For example, as the setting items, various setting items are available such as those related to installation of applications and those related to starting-up of registered applications. The operation panel 1 makes input on the operation panel 1 to select a desired setting item with respect to the application function and sets a set value on the selection screen of the selected setting item.

When the application function is selected by the function selection keys, according to the settings that the user has made on the operation panel 1, the main control section 5 installs or starts up an application, or performs a procedure according to an application.

(An Example of Selection Among Setting Items)

Figure 4:
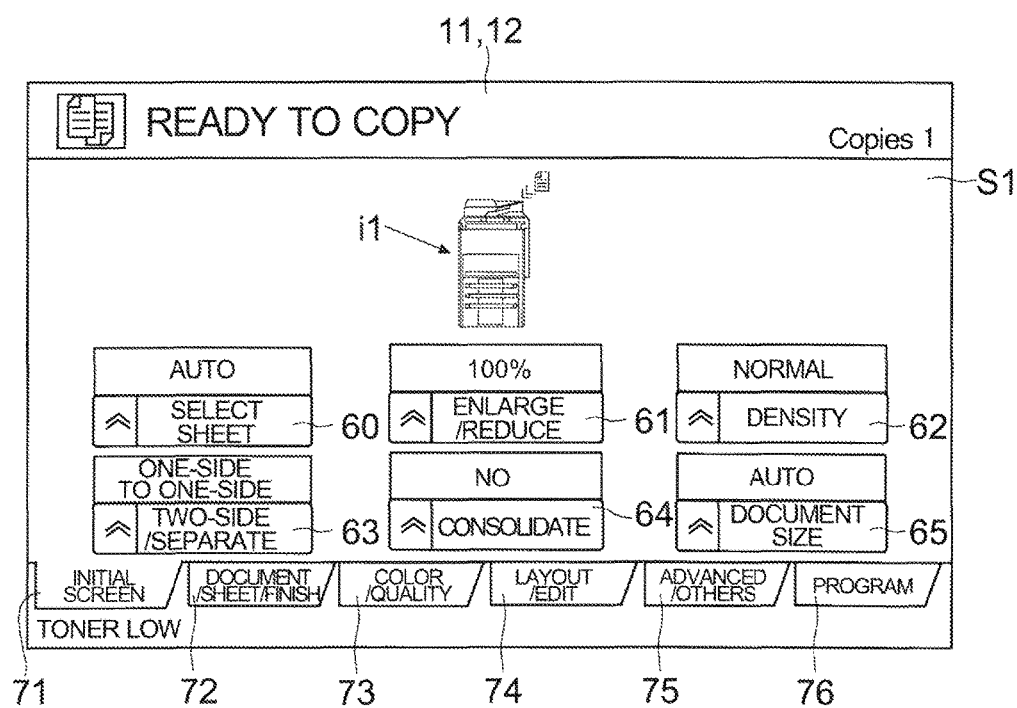
FIG. 4 is a diagram showing an initial screen of a copying function according to one embodiment of the present disclosure.
Figure 5:
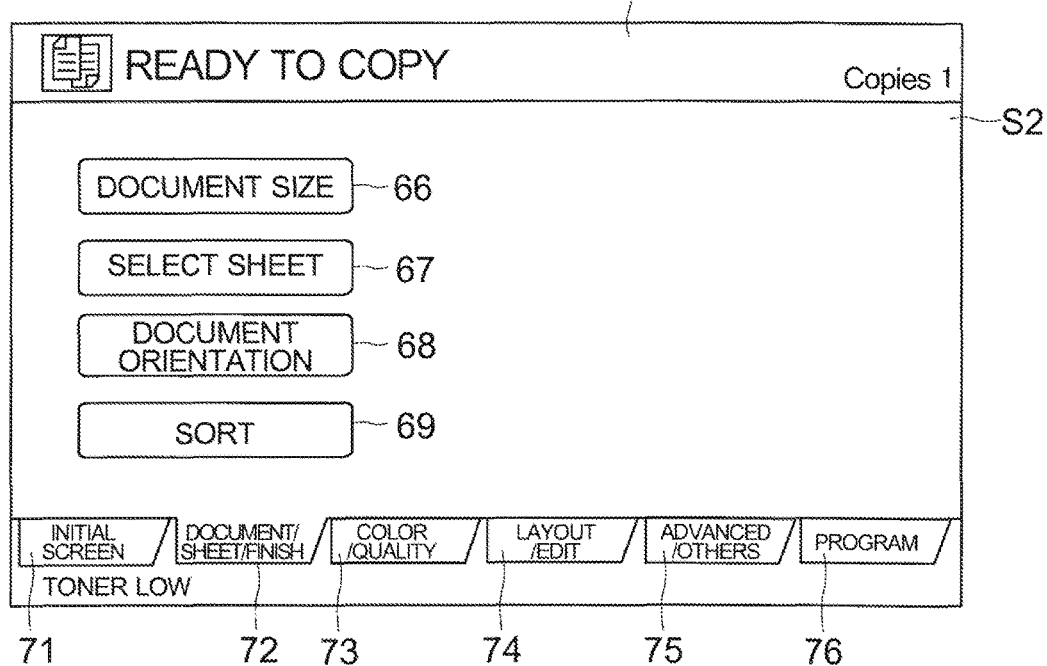
FIG. 5 is a diagram showing a screen for selection among setting items of a copying function according to one embodiment of the present disclosure.
Figure 6:
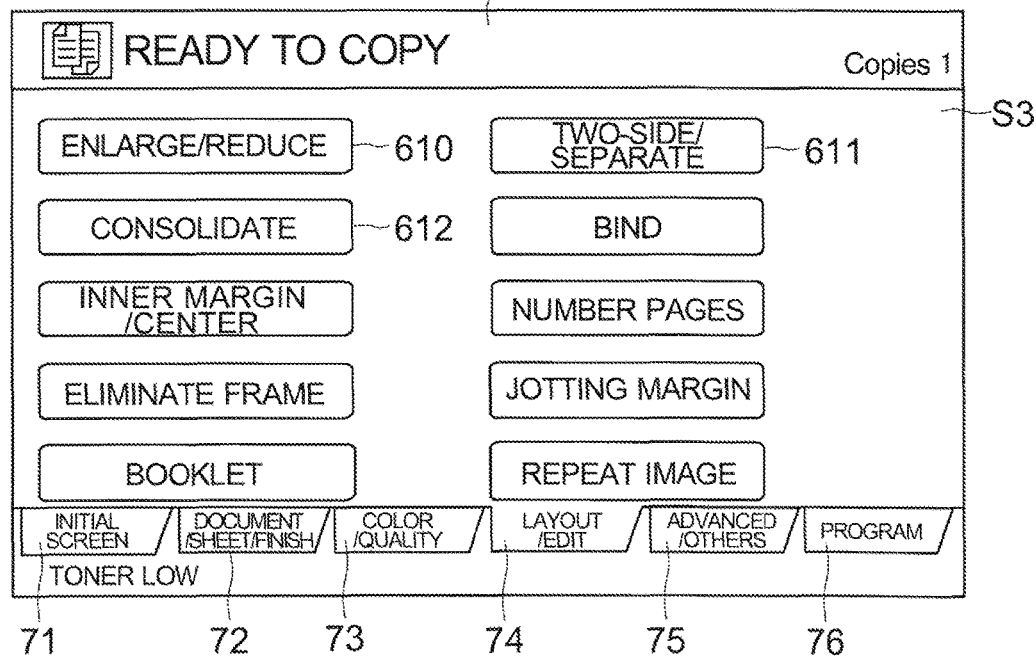
FIG. 6 is a diagram showing a screen for selection among setting items of a copying function according to one embodiment of the present disclosure.

Next, with reference to FIGS. 4 to 6, selection among setting items will be described. FIG. 4 is a diagram showing an initial screen S1 of the copying function. FIGS. 5 and 6 are diagrams showing screens for selection among setting items of the copying function.

In the embodiment, out of the functions of the multifunction peripheral 100, the copying function will be taken up and described as an example. Also for each function other than the copying function, one or more screens for selection among setting items are available.

FIG. 4 shows the initial screen S1 that the panel control portion 10 makes the display portion 11 display first when the COPY key 15a is pressed. The initial screen S1 is provided with, as selection keys for selection among setting items, a SELECT SHEET key 60 for selecting sheets to be used, an ENLARGE/REDUCE key 61 for setting the zoom magnification in copying, a DENSITY key 62 for adjusting the density of the printing results, a TWO-SIDE/SEPARATE key 63 for making settings for two-sided printing and the like, a CONSOLIDATE key 64 for setting consolidated printing (such as two in one), a DOCUMENT SIZE key 65 for specifying the document size.

Based on the output of the touch panel portion 12, when the display position of any selection key is touched other than in a tap-and-drag fashion (that is, when any selection key is touched and the touch is released before being recognized as a tap-and-drag operation), the panel control portion 10 recognizes a setting item to be selected, and displays the setting screen of the selected setting item (the details will be given later). In other words, when the touch panel portion 12 detects that, after a touch at the display position of a selection key, the touch is released without establishing a tap-and-drag operation, the display portion 11 displays the setting screen of the setting item corresponding to the selection key displayed at the touched position.

On the initial screen S1, the selection keys of those setting items which are determined to be initially displayed from viewpoints such as frequency of use are displayed. Incidentally, the setting items (selection keys) displayed on the initial screen S1 can be set on the operation panel 1, so that the selection keys of desired setting items can be displayed.

Here, a large number of setting items are available, and thus the selection keys of all the setting items cannot be displayed within a single screen (if they were, each selection key would have an extremely small size). For this reason, the setting items are classified into a plurality of categories (groups). Specifically, each category is displayed as a tab. To set a setting item that is not displayed on the initial screen S1, the display position of one of such tabs is touched.

On the screen for selection among setting items of the copying function, the panel control portion 10 makes the display portion 11 display, as tabs, an INITIAL SCREEN tab 71, a DOCUMENT/SHEET/FINISH tab 72, a COLOR/QUALITY tab 73, a LAYOUT/EDIT tab 74, an ADVANCED/OTHERS tab 75, and a PROGRAM tab 76. When a tab is touched, the panel control portion 10 makes the display portion 11 display a screen in which selection keys of setting items associated with the touched tab (those classified into the category of the touched tab) are displayed in the form of a list.

As shown in FIG. 5, for example, when the position where the DOCUMENT/SHEET/FINISH tab 72 is displayed is touched, the panel control portion 10 makes the display portion 11 display a screen (selection screen S2) that shows selection keys indicating setting items related to documents and sheets, such as document and sheet sizes, document and sheet orientations, and sheet feed source. Specifically, when the display position of the DOCUMENT/SHEET/FINISH tab 72 is touched, the panel control portion 10 displays on the selection screen S2, as selection keys, a DOCUMENT SIZE key 66 for setting the document size, a SELECT SHEET key 67 for setting the size of sheets used in printing, a DOCUMENT ORIENTATION key 68 for setting the orientation in which a document is placed on the contact glass, a PRINT SORT key 69 for setting the order of printing of pages when a plurality of copies are printed, etc.

As shown in FIG. 6, when the display position of the LAYOUT/EDIT tab 74 is touched, the panel control portion 10 makes the display portion 11 display a screen (selection screen S3) that shows selection keys of setting items related to page layout and image data editing, such as consolidated printing and two-side printing. For example, when the display position of the LAYOUT/EDIT tab 74 is touched, the panel control portion 10 displays on the selection screen S3, as selection keys, an ENLARGE/REDUCE key 610 for setting zooming, a TWO-SIDE/SEPARATE key 611 for making settings related to two-side printing etc., a CONSOLIDATE key 612 for making settings related to consolidated printing, etc. No description will be given of selection keys corresponding to other setting items.

As described above, the panel control portion 10 makes the display portion 11 display a plurality of tabs, and when the touch panel portion 12 detects a touch at the display position of a tab, the panel control portion 10 makes the display portion 11 display selection keys (such as the SELECT SHEET key 60 or 67 and the DOCUMENT SIZE key 65 or 66) for selection among a plurality of setting items classified with reference to the tabs and included in the function. Then, the display portion 11 displays the setting screen of the selected setting item. Incidentally, when a touch at the display position of the INITIAL SCREEN tab 71 is detected by the touch panel portion 12, the panel control portion 10 makes the display portion 11 display the initial screen S1 shown in FIG. 4.

(An Example of Setting of Set Values)

Figure 7:
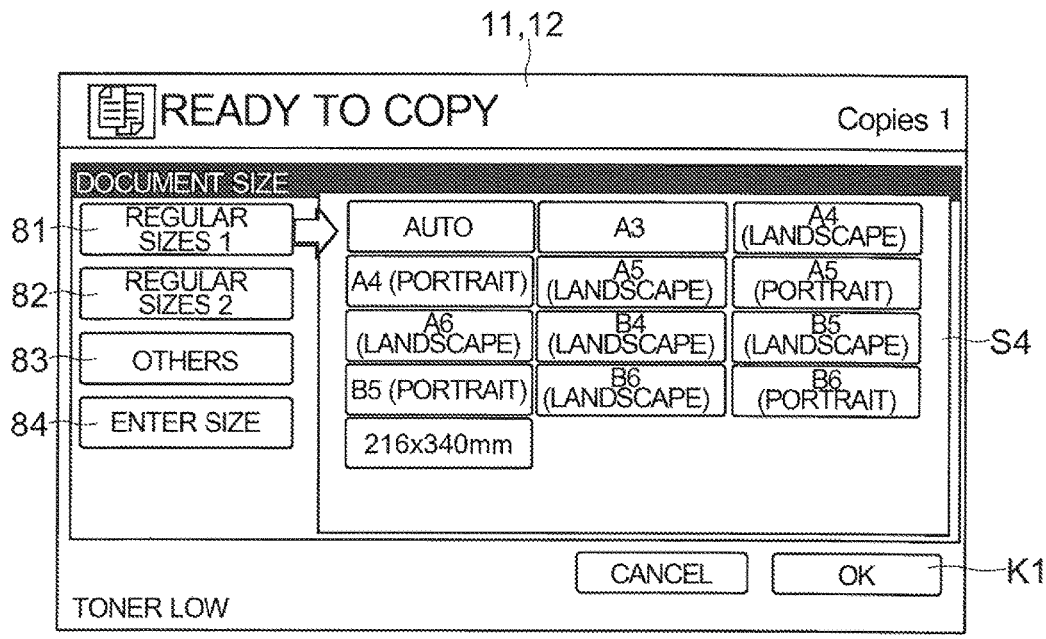
FIG. 7 is a diagram showing a setting screen of setting items of document size according to one embodiment of the present disclosure.
Figure 8:
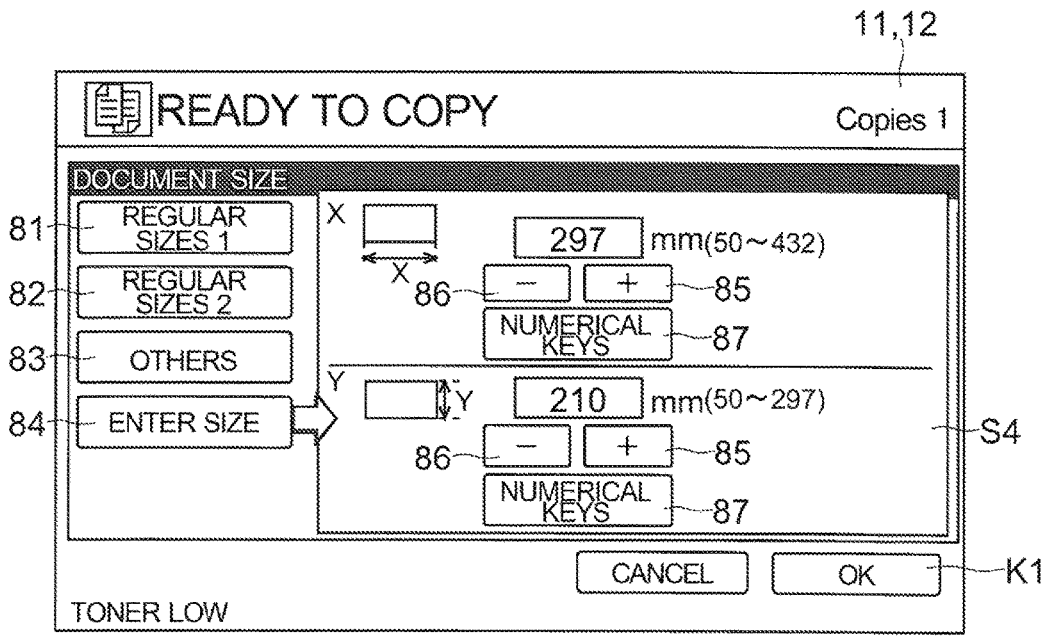
FIG. 8 is a diagram showing a setting screen of setting items of document size according to one embodiment of the present disclosure.

Next, with reference to FIGS. 7 and 8, the setting of set values will be described. FIGS. 7 and 8 are diagrams showing a setting screen S4 of setting items of the document size.

The following description deals with, as an example, the setting of set values of setting items of the document size in the copying function. Incidentally, setting screens are available for different setting items respectively; however, no description will be given of other setting items.

When setting items of the document size are selected (that is, when the display position of the DOCUMENT SIZE key 65 or 66 is touched and then the touch is released without establishing a tap-and-drag operation), the panel control portion 10 makes the display portion 11 display, within the setting screen S4 of the setting items of the document size, a plurality of setting keys for setting set values (a REGULAR SIZES 1 key 81, a REGULAR SIZES 2 key 82, an OTHERS key 83, an ENTER SIZE KEY 84, etc.). As shown in FIG. 7, when the display position of the REGULAR SIZES 1 key 81 is touched, the panel control portion 10 makes the display portion 11 display setting keys for selection among regular sheet sizes of the "A" and "B" series in the form of a list. The user touches the display position of, among the plurality of keys displayed, the key corresponding to the size (and orientation) of the document.

Though omitted from illustration, when the display position of the REGULAR SIZES 2 key 82 is touched, the panel control portion 10 makes the display portion 11 display keys for selection among inch-based regular sizes (such as letter size and statement size) in the form of a list. When the display position of the OTHERS key 83 is touched, the panel control portion 10 displays keys for selection among postcard size and other special sheet sizes in the form of a list.

As shown in FIG. 8, when the display position of the ENTER SIZE KEY 84 is touched, the panel control portion 10 makes the display portion 11 display keys for manual input of irregular sheet sizes. For example, the panel control portion 10 displays, as setting keys, for each of the longer and shorter sides of sheets, a "plus" key 85 for increasing the displayed size, a "minus" key 86 for decreasing it, a NUMERICAL KEYPAD key 87 for accepting manual input via the numerical keypad section 13, etc. The user manually inputs the document size on the operation panel 1.

On completing the setting of the document size, the user touches the display position of the OK key K1 shown on each selection screen. When the OK key K1 is touched, the panel control portion 10 recognizes the size of the key displayed at the touched position, or the manually entered size, as the document size. Then, when the START key 14 is pressed, the main control section 5 takes the document size as the set size in a copying job, and accordingly proceeds with the reading of the document and the processing of the image data obtained through the reading.

(Setting Item Explanation Screen S5)

Figure 9:
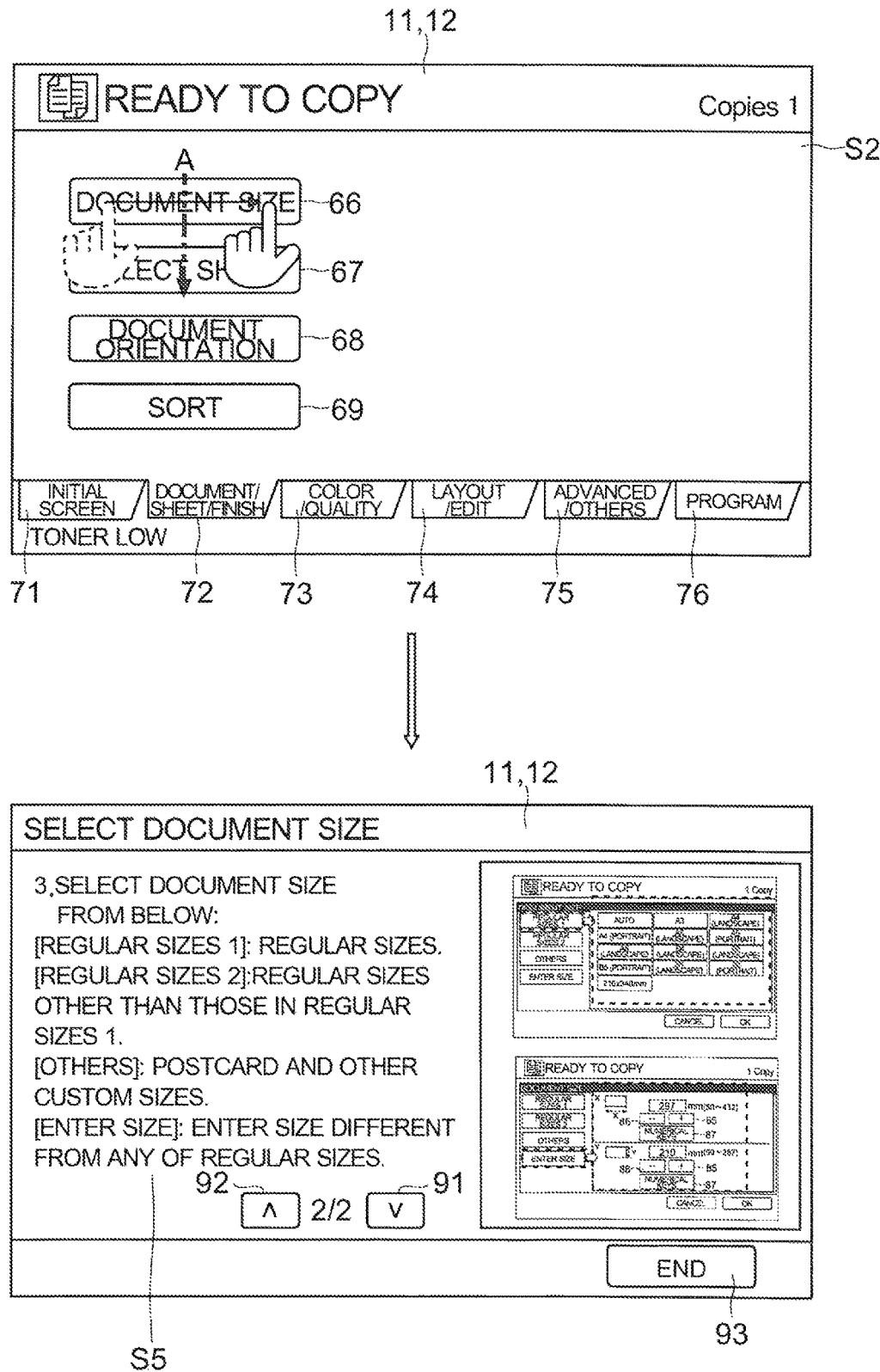
FIG. 9 is a diagram showing an example of a setting item explanation screen according to one embodiment of the present disclosure.

Next, with reference to FIG. 9, the display of an explanation screen of a setting item on the operation panel 1 according to the embodiment will be described. FIG. 9 is a diagram showing an example of a setting item explanation screen S5.

As described above, on the multifunction peripheral 100, a plurality of functions (copying, transmission, etc.) can be used. In each function, a large number of setting items are available. The setting items include those which permit the setting of a plurality of set values. Thus, there can in total be so many setting items and set values settable on the multifunction peripheral 100 that the user cannot remember all of them.

Thus, the user may feel at a loss when making settings on the operation panel 1. To help the user, a capability to display help screens is often provided. Conventionally, it is common that, when the display position of a help key is touched, a help screen is called up.

However, a help key is often displayed in a position difficult to notice at first glance, or in a position away from the key that the user is gazing at with the intention to touch its display position; thus, inconveniently, a help key can be difficult to notice and use. As a solution, in the image forming apparatus according to the embodiment, a configuration is adopted where, with a tap-and-drag operation alone, a relevant explanation screen (help screen) can easily be called up, and this makes the operation panel 1 easier to use.

Now, with reference to FIG. 9, how an explanation screen of a setting item is called up will be described. The upper half of FIG. 9 shows a selection screen S2 of setting items of the copying function (in the state after the DOCUMENT/ SHEET/FINISH tab 72 has been touched).

In the multifunction peripheral 100 according to the embodiment, it is possible, by making a tap-and-drag operation on the selection key of the setting item of which the explanation screen is to be called up, to call up the explanation screen of the setting item for which the tap-and-drag operation has been made. For example, when the setting item explanation screen S5 of the document size needs to be called up, as shown in FIG. 9, while a touch inside the display region of a selection key (DOCUMENT SIZE key 66) of the document size is maintained, the touched position is moved. Here, only part of the movement path of the touched position has to pass through the display region of the selection key. For each setting item, a setting item explanation screen S5 is available. For other setting item explanation screens S5, no illustrations or examples will be given.

When a tap-and-drag operation is made in the display region of a selection key, as shown in the lower part of FIG. 9, the panel control portion 10 makes the display portion 11 display the setting item explanation screen S5 of the document size. In the setting item explanation screen S5 in FIG. 9, while a diagram is shown, an explanation of how to set the document size is shown.

In the multifunction peripheral 100 according to the embodiment, on every explanation screen, a NEXT PAGE key 91, a PREVIOUS PAGE key 92, and an END key 93 are provided. When a touch at the display position of the NEXT PAGE key 91 is detected by the touch panel portion 12, the panel control portion 10 makes the display portion 11 display the explanation screen of the next page (if already on the last page with no next page, the display remains unchanged). When a touch at the display position of the PREVIOUS PAGE key 92 is detected by the touch panel portion 12, the panel control portion 10 makes the display portion 11 display the explanation screen of the previous page (if already on the first page with no previous page, the display remains unchanged). When a touch at the display position of the END key 93 is detected by the touch panel portion 12, the panel control portion 10 ends the display of the explanation screen (closes the explanation screen), and makes the display portion 11 display the screen before the display of the explanation screen (returns to the previous screen).

As described above, when the touch panel portion 12 detects a tap-and-drag operation inside the display position of a selection key, the panel control portion 10 makes the display portion 11 display the setting item explanation screen S5 that explains the setting item displayed at the position where the tap-and-drag operation has been made (the setting item corresponding to the selection key on which the tap-and-drag operation has been made).

In this way, simply by making an operation involving tapping on and dragging across the display position of a selection key (such as the SELECT SHEET key 60 or the DOCUMENT SIZE key 65 or 66) of the setting item on which the user needs information as to its content and how to set it, the user can directly call up the setting item explanation screen S5 for which he has made the tap-and-drag operation. Thus, without making a plurality of stages of operation including, for example, finding a help key located at any position within the screen and touching the display position of the help key as conventionally practiced, it is possible to call up and display a desired setting item explanation screen S5. This makes the display/input device (operation panel 1) easier to use in terms of operation for displaying explanation screens.

Incidentally, when, while a touch is maintained, the touched position is moved across a previously determined distance or more, the touch panel portion 12 detects a "tap-and-drag operation" to have been made. The previously determined distance is a distance that can be determined arbitrarily. For example, the previously determined distance is set to be longer than the length of a small displacement (for example, a few millimeters) of the touched position as observed when an ordinary touch (the display position of a key is simply touched) is made. This prevents erroneous recognition as a tap-and-drag operation of a small displacement of the touched position due to, for example, the touched position sliding, or the finger having an angle when making the touch.

Discussed thus far has been a case where a tap-and-drag operation is made on one selection key. A tap-and-drag operation may be made on a plurality of selection keys consecutively at a time (a single tap-and-drag operation may be made across a plurality of selection keys). Specifically, when it is detected that a single tap-and-drag operation is made across a plurality of selection keys, the display portion 11 displays a plurality of setting item explanation screens S5 corresponding to the plurality of selection keys on which the tap-and-drag operation has been made.

For example, when, in the upper part of FIG. 9, a tap-and-drag operation is made on the DOCUMENT SIZE key 66 and the SELECT SHEET key 67 consecutively at a time in the vertical direction of the figure (in the upper part of FIG. 9, an example of a tap-and-drag operation across a plurality of selection keys is indicated by arrow A with a dash-dot-dot line), then, as shown in the lower part of FIG. 9, the panel control portion 10 makes the display portion 11 display, first, the setting item explanation screen S5 of the document size; when the NEXT PAGE key 91 is operated on the last page of the setting item explanation screen S5 of the document size, the panel control portion 10 may make the display portion 11 display the setting item explanation screen S5 for sheet selection. In other words, when a tap-and-drag operation is made on a plurality of selection keys, the panel control portion 10 makes the display portion 11 display a setting item explanation screen S5 that explains one of the setting items of the selection keys on which the tap-and-drag operation has been made, followed by a setting item explanation screen S5 of another setting item of which the setting item explanation screen S5 has not yet been displayed.

In this way, by a single tap-and-drag operation, a plurality of keys can be selected. Thus, a plurality of kinds of setting item selection screens S5 corresponding to the plurality of selection keys selected by the tap-and-drag operation can be displayed consecutively. This makes the display/input device (operation panel 1) still easier to use in terms of operation for displaying explanation screens.

Here, the user may touch the display position of a selection key and, while setting the selected setting item, feel the need to see the setting item explanation screen S5. For example, the user may need to know what settings can be made on the setting screen of the setting item, or how, when a set value is set, it will be reflected in a job.

Accordingly, in the multifunction peripheral 100 according to the embodiment, also when a tap-and-drag operation is made in the display region of any setting key (in the example shown in FIG. 7, the setting keys such as the REGULAR SIZES 1 key 81) arranged on the setting screen of the selected setting item, as shown in the lower half of FIG. 9, the panel control portion 10 may make the display portion 11 display the setting item explanation screen S5 corresponding to the setting item currently being set (displayed) (only part of the movement path of the touched position has to pass through the display region of the setting key).

In this way, after a touch at the display position of a selection key (such as the SELECT SHEET key 60 or the DOCUMENT SIZE key 65 or 66), when it is detected that the touch is released without establishing a tap-and-drag operation, the display portion 11 displays the setting screen for the setting item corresponding to the selection key displayed at the touched position, and displays, within the setting screen, setting keys (such as the REGULAR SIZES 1 key 81, the ENTER SIZE KEY 84, and the "plus" key 85) for setting a set value of the setting item. When a tap-and-drag operation within the display position of a setting key is detected, the display portion 11 displays the setting item explanation screen S5 of the setting item corresponding to the setting screen currently being displayed. Thus, while the setting screen of a setting item is displayed, even when the user has no idea which set value to set, he can easily call up the setting item explanation screen S5 to confirm the content of the setting item and the set value.

(Function Explanation Screen S6)

Figure 10:
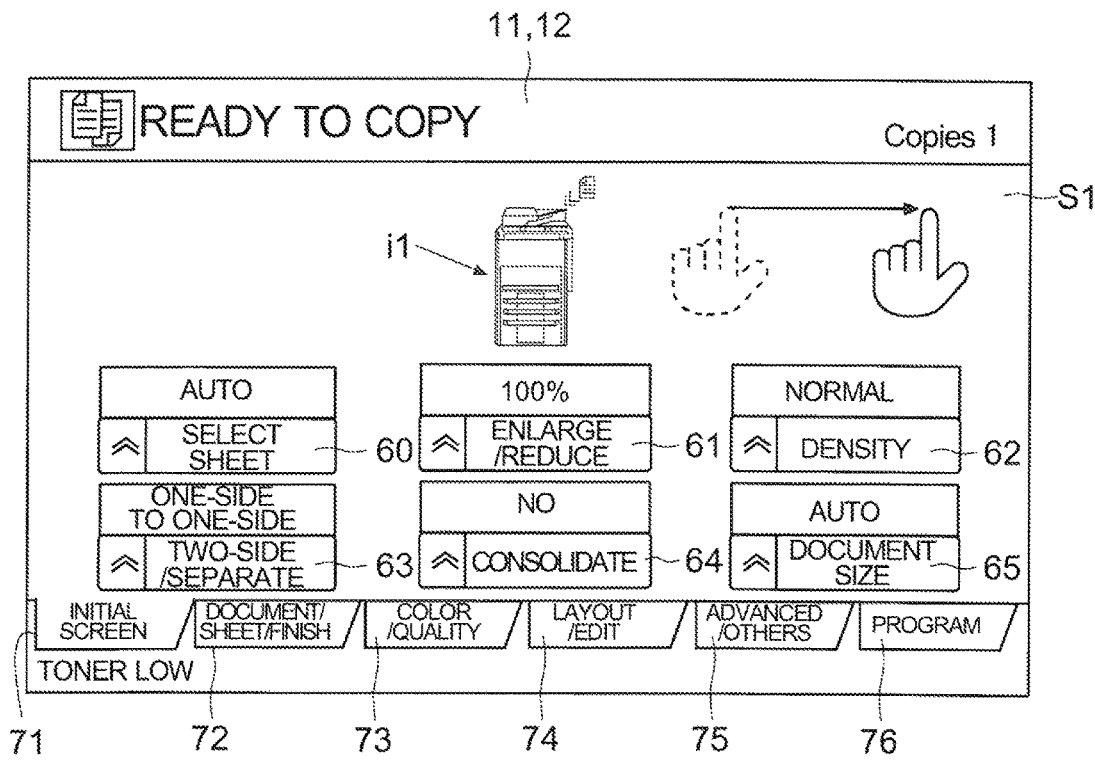
FIG. 10 is a diagram showing a function explanation screen according to one embodiment of the present disclosure.
Figure 10:
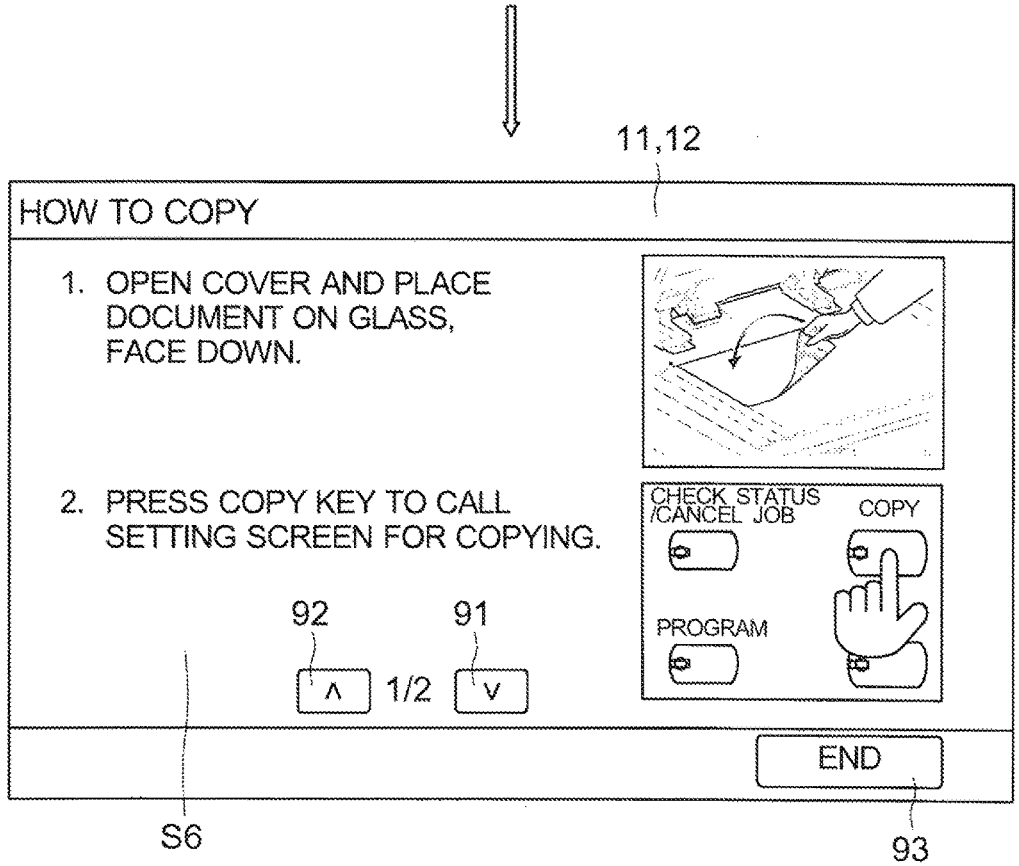

Next, with reference to FIG. 10, the display of a tap-and-drag operation explanation screen in a blank portion on the operation panel 1 in the embodiment will be described. FIG. 10 is a diagram showing a function explanation screen S6.

The upper part of FIG. 10 shows an example of the initial screen S1 of the copying function. In the multifunction peripheral 100 according to the embodiment, it is possible, by making a tap-and-drag operation in a blank region where no selection keys or setting keys for setting set values or characters are displayed, to call up the explanation screen (function explanation screen S6) of the function currently being set (about to be executed). For example, when an explanation screen giving a rough explanation on how to use the copying function needs to be called up, as shown in FIG. 10, while a touch is maintained in a blank region where no selection keys or setting keys or characters or figures are displayed, the touched position is moved (a tap-and-drag operation in a blank region). For each function, a function explanation screen S6 is available. For function explanation screens S6 other than that for copying, no illustrations or examples will be given.

As shown in the lower half of FIG. 10, during the setting of the copying function, when a tap-and-drag operation is made in a blank, the panel control portion 10 makes the display portion 11 display a function explanation that explains how to use the copying function. On the function explanation screen S6 in FIG. 10, while a diagram is shown, an explanation of how to copy is shown.

In this way, when the touch panel portion 12 detects a tap-and-drag operation at the display position of a blank within the display region of the display portion 11, the panel control portion 10 makes the display portion 11 display a function explanation screen S6 that explains how to use the function. Thus, by tapping-and-dragging the display position of a blank, the user can make the display portion 11 display a function explanation screen S6 to grasp an overall flow of the use of the function.

(Tab Explanation Screen S7)

Figure 11:
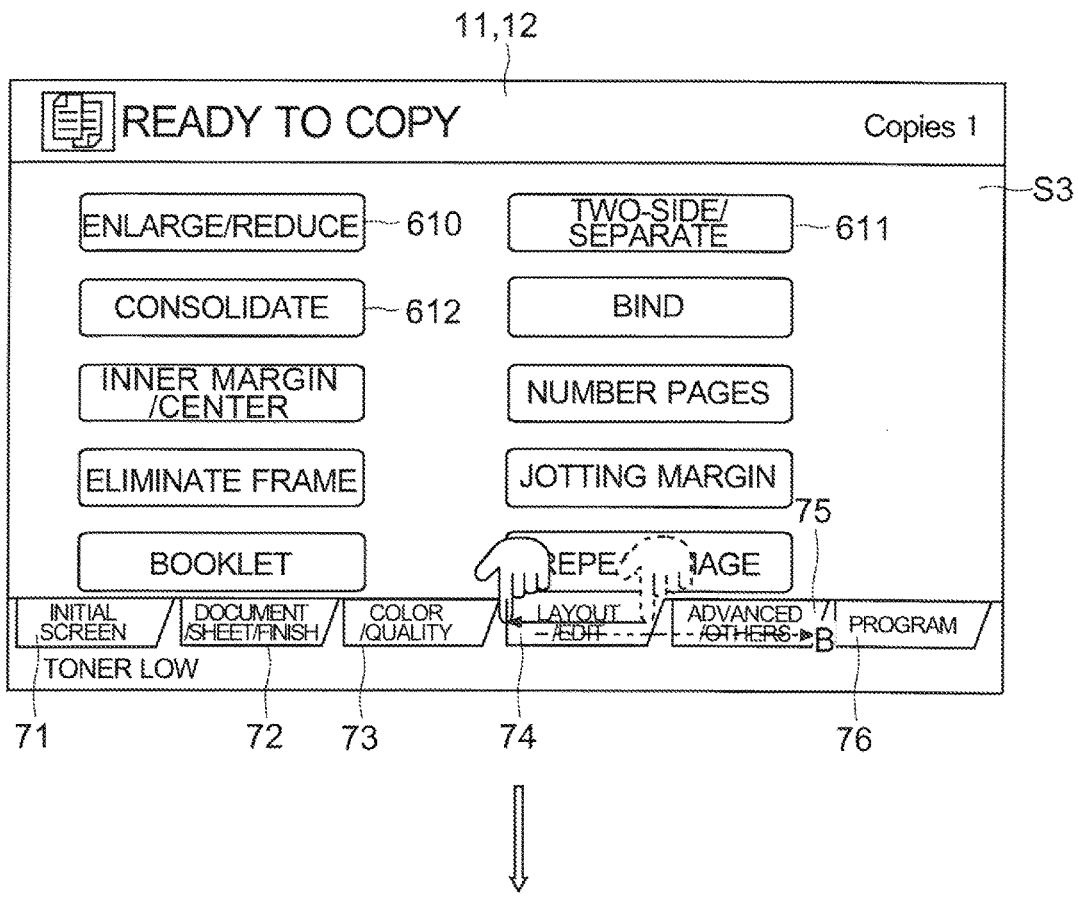
FIG. 11 is a diagram showing an example of a tab explanation diagram according to one embodiment of the present disclosure.
Figure 11:
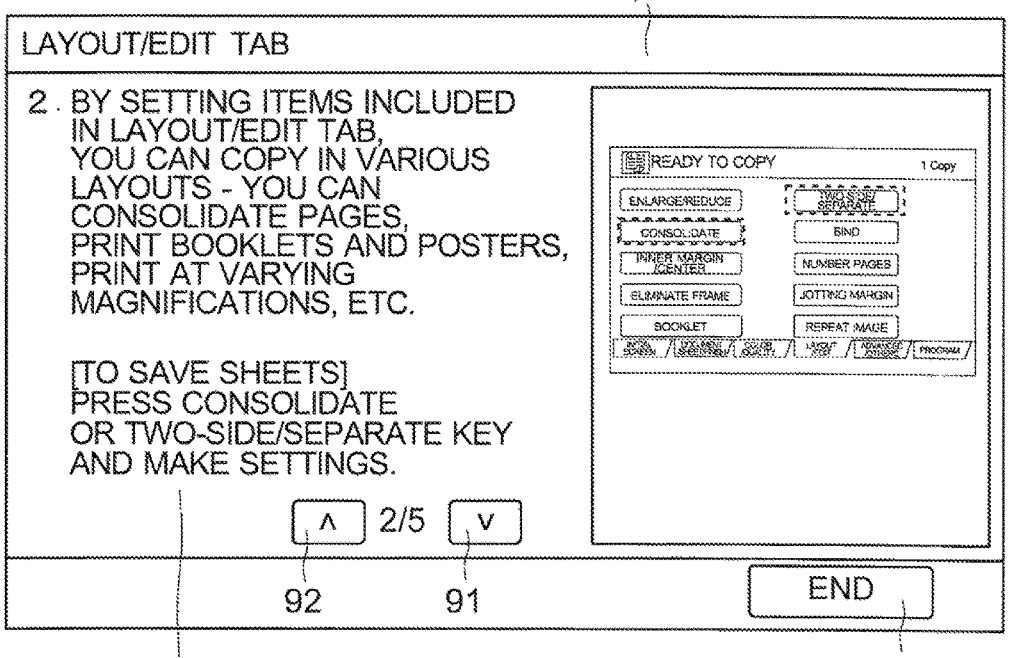

Next, with reference to FIG. 11, the display of a tab explanation screen S7 on the operation panel 1 in the embodiment will be described. FIG. 11 is a diagram showing an example of a tab explanation screen S7.

The upper half of FIG. 11 shows an example of the selection screen S3 of the setting items displayed when the display position of the LAYOUT/EDIT tab 74 is touched. In the multifunction peripheral 100 according to the embodiment, when the display position of a tab is touched, the panel control portion 10 makes the display portion 11 display a selection screen that displays selection keys of setting items classified into the tab.

By making a tap-and-drag operation in the display region (display position) of the same tab that has just been touched (the tab corresponding to the selection screen currently being displayed), it is possible to call up the explanation screen (tab explanation screen S7) of the tab (category) currently being selected. As shown in the upper half of FIG. 11, when a tab explanation screen S7 needs to be called up, the user, while maintaining a touch at the display position of the tab currently being selected, moves the touched position.

As shown in the lower half of FIG. 11, when a tap-and-drag operation is made on the tab currently being selected, the panel control portion 10 makes the display portion 11 display a function explanation that explains the tab. In the tab explanation screen S7 in FIG. 11, while a diagram is shown, an explanation about selection among setting items classified into the tab and about setting of set values is shown. For each tab, a tab explanation screen S7 is available; however, for tab explanation screens S7 other than that for the LAYOUT/EDIT tab, no illustrations or examples will be given. When a touch at the display position of the END key 93 on the tab explanation screen S7 is detected by the touch panel portion 12, the panel control portion 10 ends the display of the tab explanation screen S7 (closes the explanation screen), and makes the display portion 11 display the screen before the display of the tab explanation screen S7 (returns to the previous screen).

When a large number of setting items are available, for easy selection of the target setting item, the setting items may be classified (grouped) according to their content. Accordingly, the panel control portion 10 makes the display portion 11 display a plurality of tabs (such as the INITIAL SCREEN tab 71). When the touch panel portion 12 detects a touch at the display position of a tab, the panel control portion 10 makes the display portion 11 display a plurality of selection keys (such as the SELECT SHEET key 60 and the DOCUMENT SIZE keys 65 and 66) of setting items classified into the tab. Moreover, when the touch panel portion 12 detects a tap-and-drag operation at the display position of the tab currently being selected, the panel control portion 10 makes the display portion 11 display the tab explanation screen S7 that explains the tab displayed at the position on which the tap-and-drag operation has been made.

Thus, by tapping-and-dragging the display position of a tab, the user can make the display portion 11 display a tab explanation screen S7 to check the content of the tab etc. Classification is done in hierarchies, namely into functions (in a high hierarchy), tabs (in a middle hierarchy), and setting items (in a low hierarchy).

The above description deals with an example where a tap-and-drag operation is made on a tab currently being selected. Instead, irrespective of whether or not a tab is currently being selected, whenever a tap-and-drag operation is made at the display position of a tab, the panel control portion 10 may make the display portion 11 display an explanation screen that explains the tab on which the tap-and-drag operation has been made.

Discussed above is a case where a tap-and-drag operation is made on a single tab. Instead, a tap-and-drag operation may be made on a plurality of tabs consecutively at a time (a single tap-and-drag operation may be made across a plurality of tabs). Specifically, when a single tap-and-drag operation on a plurality of tabs is detected, the display portion 11 displays a plurality of tab explanation screens S7 corresponding to the plurality of tabs on which the tap-and-drag operation has been made.

For example, in the upper part of FIG. 11, when a single tap-and-drag operation is made on the LAYOUT/EDIT tab 74 and the others tab 75 consecutively (in the upper part of FIG. 11, an example of a tap-and-drag operation across a plurality of selection keys is indicated by arrow B with a dash-dot-dot line), then, as shown in the lower part of FIG. 11, the panel control portion 10 makes the display portion 11 display, first, the tab explanation screen S7 of the LAYOUT/EDIT tab 74. When the NEXT PAGE key 91 is operated on the last page of the tab explanation screen S7 of the LAYOUT/EDIT tab 74, the panel control portion 10 may make the display portion 11 display the tab explanation screen S7 of the ADVANCED/OTHERS tab. In other words, when a tap-and-drag operation is made on a plurality of tabs, the panel control portion 10 makes the display portion 11 display a tab explanation screen S7 that explains the function of one of the tabs on which the tap-and-drag operation has been made, followed by a tab explanation screen S7 of, of the tabs on which the tap-and-drag operation has been made, a tab of which the tab explanation screen S7 has not yet been displayed.

In this way, with a single tap-and-drag operation, a plurality of tabs can be selected. And the tab explanation screens S7 corresponding to the plurality of tabs selected with the single tap-and-drag operation can be displayed consecutively. This make the display/input device (operation panel 1) still easier to use in terms of operation for displaying explanation screens.

Based on the output of the touch panel portion 12, when the display position of any tab is touched other than in a tap-and-drag fashion (that is, when any tab is touched and the touch is released before being recognized as a tap-and-drag operation), the panel control portion 10 recognizes the tab to be selected. Then, the panel control portion 10 makes the display portion 11 display the selection screen of the setting items corresponding to the touched tab. On the other hand, based on the output of the touch panel portion 12, when the display position of a tab is touched with a tap-and-drag operation (that is, after any tab is touched, while the touch is maintained, the touched position is moved until a tap-and-drag operation is recognized), the panel control portion 10 recognizes the tab to be selected, and makes the display portion 11 display the explanation screen corresponding to the touched tab.

When a touch at the display position of the END key 93 within the tab explanation screen is detected by the touch panel portion 12, the panel control portion 10 ends the display of the tab explanation screen (closes the explanation screen), and makes the display portion 11 display the screen before the display of the tab explanation screen S7 (makes the display portion 11 display the selection screen S3 corresponding to the previously selected tab).

(Status Screen S8)

Figure 12:
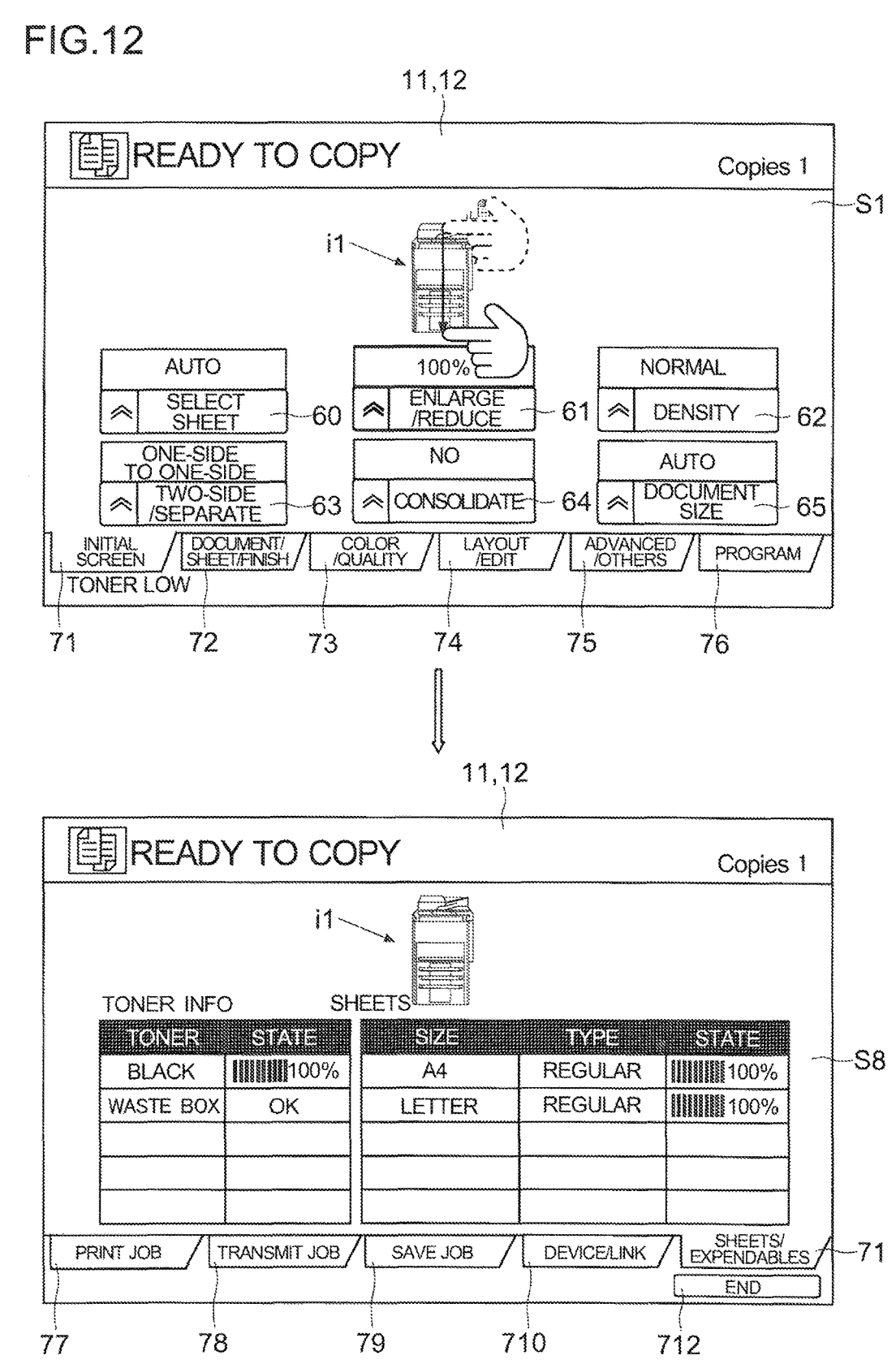

Next, with reference to FIG. 12, a shift to a status screen S8 on the operation panel 1 in the embodiment will be described. FIG. 12 is a diagram showing a shift to a status screen S8.

The upper half of FIG. 12 shows an example of the initial screen S1 of the copying function. On the initial screen S1, a figure of the multifunction peripheral 100 is displayed. As shown there, the panel control portion 10 sometimes makes the display portion 11 display an image of the multifunction peripheral 100 (an apparatus image i1). According to the status of the multifunction peripheral 100—during execution of jobs such as printing and document reading, on occurrence of errors such as sheet jamming (obstruction), and so forth, the panel control portion 10 makes the display portion 11 display previously determined images (arrows and symbols) around the image of the multifunction peripheral 100.

In the multifunction peripheral 100 according to the embodiment, it is possible, by making a tap-and-drag operation in the display region (display position) of the image of the multifunction peripheral 100 (apparatus image i1), to display a status screen S8 of the multifunction peripheral 100. The status screen S8 is a screen that shows and explains the status of the multifunction peripheral 100 to the user. Specifically, as shown in the upper half of FIG. 12, to call the status screen S8, the user, while maintaining a touch at the display position of the image indicating the multifunction peripheral 100, moves the touched position.

As shown in the lower half of FIG. 12, when a tap-and-drag operation is made on the image of the multifunction peripheral 100 (apparatus image i1), the panel control portion 10 makes the display portion 11 display the status screen S8. FIG. 12 shows a state where, as a result of the display position of the SHEETS/EXPENDABLES tab being touched, a status screen S8 indicating information on (at least one of) the remaining quantities of toner and sheets is displayed.

Each cassette 31 is provided with a remaining sheet sensor 31a for detecting the remaining quantity of sheets (see FIG. 1). The output of each remaining sheet sensor 31a is fed to the main control section 5. Based on the output of the remaining sheet sensor 31a, the main control section 5 recognizes the remaining quantity of sheets in the cassette 31. When displaying the status screen S8, the panel control portion 10 receives from the main control section 5 data indicating the quantity of sheets remaining in each sheet cassette 31. Based on the data indicating the remaining quantity of sheets, the panel control portion 10 makes the display portion 11 display the quantity of sheets remaining in each cassette 31.

Moreover, a toner container 44a for supplying toner to a developing device 44 is provided (see FIG. 1; indicated by broken lines). The developing device 44 develops the electrostatic latent image that the exposing device 43 forms by scanning, and exposing to light, the photosensitive drum 41 that has been electrostatically charged by a charging portion 42 (see FIG. 1). The toner container 44a is provided with a remaining toner sensor 44b. The output of the remaining toner sensor 44b is fed to the main control section 5. Based on the output of the remaining toner sensor 44b, the main control section 5 recognizes the quantity of toner remaining in the toner container 44a. Instead, the main control section 5 may recognize the remaining quantity in the toner container 44a based on the count of dots carrying toner after the toner container 44a is fitted. When displaying the status screen S8, the panel control portion 10 receives from the main control section 5 data indicating the quantity of toner remaining in the toner container 44a. Based on the data indicating the remaining quantity of toner, the panel control portion 10 makes the display portion 11 display the quantity of toner remaining in the toner container 44a.

Moreover, in the multifunction peripheral 100 according to the embodiment, a waste box (waste toner box 46a) for storing the waste toner and dust collected by a cleaning device 46 is provided (see FIG. 1; indicated by a broken line). The cleaning device 46 removes the toner remaining on the surface of the photosensitive drum 41 (see FIG. 1). The waste toner is transported from the cleaning device 46 to the waste toner box 46a by a transport mechanism (not shown) including a transport pipe. The waste toner box 46a is provided with a fullness detection sensor 46b for detecting whether or not the waste toner box 46a is full. The output of the fullness detection sensor 46b is fed to the main control section 5. Based on the output of the fullness detection sensor 46b, the main control section 5 recognizes whether or not the waste toner box 46a is full. When displaying the status screen S8, the panel control portion 10 receives from the main control section 5 data indicating whether or not the waste toner box 46a is full. Based on the data from the main control section 5, the panel control portion 10 makes the display portion 11 display whether or not the waste toner box 46a is full.

Incidentally, the status screen S8 is provided with a PRINT JOB tab 77, a TRANSMISSION JOB tab 78, a SAVE JOB tab 79, a DEVICE/LINK tab 710, and a SHEETS/EXPENDABLES tab 711. When the display position of the PRINT JOB tab 77 is touched, the panel control portion 10 makes the display portion 11 display a screen (a kind of the status screen S8) indicating the status (whether currently being executed or waiting for execution, whether there is an error, etc.) of a print job entered in the multifunction peripheral 100. When the display position of the TRANSMISSION JOB tab 78 is touched, the panel control portion 10 makes the display portion 11 display a screen (a kind of the status screen S8) indicating the status (whether currently being executed or waiting for execution, whether there is an error, etc.) of a transmission job entered in the multifunction peripheral 100. When the display position of the SAVE JOB tab 79 is touched, the panel control portion 10 makes the display portion 11 display a screen (a kind of the status screen S8) indicating the status (whether currently being executed or waiting for execution etc.) of a job (such as a job whose execution requires a cancellation condition) entered in the multifunction peripheral 100 and stored in the storage device 52. When the display position of the DEVICE/LINK tab 710 is touched, the panel control portion 10 makes the display portion 11 display a screen (a kind of the status screen S8) indicating the communication status (whether communication across a network is present, how transmission/reception is proceeding on a facsimile line, whether there is an error on a communication line) of the multifunction peripheral 100. When the display position of the SHEETS/EXPENDABLES tab 711 is touched, the panel control portion 10 makes the display portion 11 display the status screen S8 that indicates the quantities of toner and sheets remaining in the multifunction peripheral 100 as shown in the lower half of FIG. 12. Thus, the user can easily call up a screen from which he can grasp the states of members that may require replacement or replenishment, for example expendables such as toner.

As described above, first, the display portion 11 displays the apparatus image it which is an image of the apparatus (an image of the multifunction peripheral 100). Then, when the touch panel portion 12 detects a tap-and-drag operation at the display position of the image of the multifunction peripheral 100, the panel control portion 10 makes the display portion 11 display the status screen S8 indicating the status of the apparatus at the position where the tap-and-drag operation has been made. In this way, without making operations in a plurality of steps for displaying a status screen S8 indicating the status of the apparatus as conventionally practiced, it is possible to display the status screen S8 (to jump to the status screen S8).

When the touch panel portion 12 detects a touch at the display position of the END key 712 within the status screen S8, the panel control portion 10 makes the display portion 11 end the display of the status screen S8 (makes it close the status screen S8), and makes it display the screen before the display of the status screen S8 (return to the previous screen).

Moreover, the image forming apparatus (multifunction peripheral 100) according to the embodiment includes a display/input device (operation panel 1) according to the embodiment. The display/input device (operation panel 1) allows the user to call up explanation screens easily, and is easy for the user to use; it thus helps realize an image forming apparatus (multifunction peripheral 100) that allows easy operation and setting for use of its functions and is therefore easy to use.

An embodiment of the present disclosure has been described above. The scope of the present disclosure, however, is not limited by the embodiment. The present disclosure may be implemented with any modifications made without departing from its spirit.

The above description of the embodiment of the present disclosure may be grasped as disclosing methods as well.

What is claimed is:
1. A display/input device comprising:
a touch panel portion configured to:
accept input by a user,
detect a touched position, and
detect a tap-and-drag operation in which, while a touch is maintained, the touched position is moved; and
a display portion configured to:
display selection keys, a tab, and an apparatus image within a same screen,
wherein the selection keys are keys for selecting one setting item among a plurality of setting items of an image forming apparatus and are keys including setting item names,
the apparatus image is an image of the image forming apparatus, and
the display portion is further configured to:
display, when the tap-and-drag operation is detected within a display position of the selection keys, a setting item explanation screen in place of the entire screen including the selection keys;
start, when an end key provided on the setting item explanation screen is touched, displaying, in place of the setting item explanation screen, the screen including the selection keys that was displayed before the display of the setting item explanation screen;

display, when the tap-and-drag operation on the plurality of selection keys is detected by the tap-and-drag operation being made once, one of a plurality of setting item explanation screens corresponding to the plurality of selection keys on which the tap-and-drag operation was made;

display, when a NEXT PAGE key arranged on the setting item explanation screen is operated, a setting item explanation screen for a next setting item;

display, when a touch at the display position of the tab is detected, the selection keys for the setting items classified with reference to the tab;

display, when the tap-and-drag operation is detected at the display position of the tab, a tab explanation screen in place of the entire screen including the tab;

start, when an END key provided on the tab explanation screen is touched, display of the screen including the tab which was being displayed before display of the tab explanation screen;

display, when the tap-and-drag operation on a plurality of tabs is detected by the tap-and-drag operation being made once, one of a plurality of tab explanation screens corresponding to the plurality of tabs on which the tap-and-drag operation was made;

display, when a NEXT PAGE key arranged on the tab explanation screen is operated, a tab explanation screen for a next tab;

display, when the tap-and-drag operation is detected at a display position of the apparatus image, a status screen including the apparatus image in place of the entire screen; and start, when an END key provided on the status screen is touched, display of the screen including the apparatus image which was being displayed before display of the status screen;

the setting item explanation screen indicates to the user how to utilize the setting item corresponding to the selection key at a position where the tap-and-drag operation has been made;

the setting item explanation screens are provided one for each of the setting items;

the tab explanation screen explains selection of a setting item classified to the tab and setting of a set value;

the tab explanation screens are provided one for each of the tabs; and the status screen indicates status of an apparatus displayed at the position where the tap-and-drag operation has been made.

2. The display/input device according to claim 1, wherein, when the tap-and-drag operation is detected in a display position of a blank within a display region of the display portion, the display portion displays, in place of the screen including the selection keys, a function explanation screen that explains how to use a function about to be executed, wherein a plurality of function explanation screens being provided one for each function.

3. The display/input device according to claim 1, wherein, on the status screen, the display portion displays information on a remaining quantity of toner and/or a remaining quantity of sheets.

4. The display/input device according to claim 1, wherein, after a touch is made at a display position of a selection key, when the touch is detected to be released without establishing the tap-and-drag operation, the display portion displays a setting screen of a setting item corresponding to the selection key displayed at the touched position, displays, within the setting screen, a setting key for setting a set value of the setting item, and displays, when the tap-and-drag operation is detected within the display position of the setting key, a setting item explanation screen of the setting item corresponding to the setting screen being displayed.

5. The display/input device according to claim 1, wherein the touch panel portion detects the tap-and-drag operation when the touched position is moved across a previously determined distance or more, and the previously determined distance is longer than a length of a small displacement of the touched position during an ordinary touch.

6. An image forming apparatus comprising the display/input device according to claim 1.

7. A method of controlling a display/input device, comprising the steps of:

accepting input by a user;

detecting a touched position;

detecting a tap-and-drag operation in which, while a touch is maintained, the touched position is moved;

displaying selection keys, a tab, and an apparatus image within a same screen, the selection keys being key for selecting one setting item among a plurality of setting items of an image forming apparatus and being keys including setting item names, the apparatus image being an image of the image forming apparatus;

displaying, when the tap-and-drag operation is detected within a display position of the selection keys, a setting item explanation screen in place of the entire screen including the selection keys;

starting, when an end key provided on the setting item explanation screen is touched, displaying, in place of the setting item explanation screen, the screen including the selection keys that was displayed before the display of the setting item explanation screen;

displaying, when the tap-and-drag operation on the plurality of selection keys is detected by the tap-and-drag operation being made once, one of a plurality of setting item explanation screens corresponding to the plurality of selection keys on which the tap-and-drag operation was made;

displaying, when a NEXT PAGE key arranged on the setting item explanation screen is operated, a setting item explanation screen for a next setting item;

displaying, when a touch at the display position of the tab is detected, the selection keys for the setting items classified with reference to the tab;

displaying, when the tap-and-drag operation is detected at the display position of the tab, a tab explanation screen in place of the entire screen including the tab;

starting, when an END key provided on the tab explanation screen is touched, display of the screen including the tab which was being displayed before display of the tab explanation screen;

displaying, when the tap-and-drag operation on a plurality of tabs is detected by the tap-and-drag operation being made once, one of a plurality of tab explanation screens corresponding to the plurality of tabs on which the tap-and-drag operation was made;

displaying, when a NEXT PAGE key arranged on the tab explanation screen is operated, a tab explanation screen for a next tab;

displaying, when the tap-and-drag operation is detected at a display position of the apparatus image, a status screen including the apparatus image in place of the entire screen; and starting, when an END key provided on the status screen is touched, display of the screen including the apparatus image which was being displayed before display of the status screen;

wherein the setting item explanation screen indicates to the user how to utilize the setting item corresponding to the selection key at a position where the tap-and-drag operation has been made;

the setting item explanation screens are provided one for each of the setting items;

the tab explanation screen explains, in place of the screen including the tab, selection of a setting item classified to the tab and setting of a set value;

the tab explanation screens are provided one for each of the tabs; and the status screen indicates status of an apparatus displayed at the position where the tap-and-drag operation has been made.

8. The method of controlling a display/input device according to claim 7, further comprising:

displaying, when the tap-and-drag operation is detected in a display position of a blank within a display region, in place of the screen including the selection keys, a function explanation screen that explains how to use a function about to be executed, wherein a plurality of function explanation screens being provided one for each function.

9. The method of controlling a display/input device according to claim 7, further comprising: displaying, on the status screen, information on a remaining quantity of toner and/or a remaining quantity of sheets.

10. The method of controlling a display/input device according to claim 7, further comprising:

after a touch is made at a display position of a selection key, when the touch is detected to be released without establishing the tap-and-drag operation, displaying a setting screen of a setting item corresponding to the selection key displayed at the touched position is displayed, displaying, within the setting screen, a setting key for setting a set value of the setting item, and displaying, when the tap-and-drag operation is detected within the display position of the setting key, a setting item explanation screen of the setting item corresponding to the setting screen being displayed.

11. The method of controlling a display/input device according to claim 7, wherein the tap-and-drag operation is detected when the touched position is moved across a previously determined distance or more, and the previously determined distance is longer than a length of a small displacement of the touched position during an ordinary touch.

\* \* \* \* \*